United States Patent [19]

Cremer et al.

[11] 4,031,279
[45] June 21, 1977

[54] COMPOSITE CONSTRUCTION OF METALLIC STRIPS DISPOSED IN SIDE-BY-SIDE RELATIONSHIP

[75] Inventors: George D. Cremer, Lemon Grove; John V. Long, El Cajon, both of Calif.

[73] Assignee: International Harvester Company, San Diego, Calif.

[22] Filed: June 30, 1975

[21] Appl. No.: 591,830

Related U.S. Application Data

[63] Continuation-in-part of Ser. No. 335,320, Feb. 23, 1973, Pat. No. 3,916,054.

[52] U.S. Cl. .................................. 428/44; 428/53; 428/116; 428/186; 428/121; 52/618; 52/580; 29/455 LM

[51] Int. Cl.² ..................... B32B 3/10; B32B 3/12; B32B 3/28; E04B 2/28

[58] Field of Search ............ 428/53, 116, 121, 181, 428/185–186, 117; 52/580, 618–619; 29/455 LM

[56] References Cited

UNITED STATES PATENTS

| 2,481,046 | 9/1949 | Scurlock | 428/186 X |
|---|---|---|---|
| 2,786,004 | 3/1957 | Schwartz et al. | 52/618 X |
| 2,831,688 | 4/1958 | Knox | 52/618 X |
| 3,037,592 | 6/1962 | Shipley et al. | 428/185 X |
| 3,227,600 | 1/1966 | Holland | 428/116 |
| 3,231,452 | 1/1966 | Thomas | 428/116 |

*Primary Examiner*—Philip Dier
*Attorney, Agent, or Firm*—Strauch, Nolan, Neale, Nies & Kurz

[57] ABSTRACT

Lightweight, compliant, structural members comprising an assemblage of metallic strips disposed in side-by-side relationship with the edges of the strips at opposite sides of the assemblage. The edges of the strips on one side of the assemblage may be folded over to provide a smoother, more continuous working surface. Point-to-point node bonding of adjacent strips and straight and nested foils at opposite sides of the assemblage can be utilized to facilitate handling and processing and to furnish lateral support.

13 Claims, 8 Drawing Figures

COMPOSITE CONSTRUCTION OF METALLIC STRIPS DISPOSED IN SIDE-BY-SIDE RELATIONSHIP

This application is a continuation-in-part of application Ser. No. 335,320 filed Feb. 23, 1973 (now U.S. Pat. No. 3,916,054).

The present invention relates to novel, improved structures useful for a variety of purposes which will be readily apparent from the disclosure herein and the accompanying drawing to those persons skilled in the arts to which the invention relates.

At the present time turbine and compressor rub rings and labyrinth seals are particularly important uses to which the novel members of the present invention may be put. The principles of the invention and its features and advantages will be developed primarily by reference to these particular applications of it. It is to be understood, however, that this is for the sake of clarity and the reader's convenience and is not intended to limit the scope of the invention.

In both the compressor and turbine sections of turbine engines and in other machines as well, a rotor (or wheel or fan) consisting of a central shaft carrying one or more rows of radially extending blades rotates in a cooperating, stationary housing or shroud surrounding the rotor. Typically, the rotor reaches an elevated temperature during operation; and a considerable clearance must be left between the blade tips and the housing or shroud to accommodate differential expansion between the rotating and stationary components of the machine.

If sufficient clearance to accommodate thermal expansion is provided, the air or other gas in the housing can be pumped past the tips of the rotor blades in significant quantities, substantially reducing the efficiency of the machine.

Accordingly, a number of schemes for preventing gas flow between the tips of the rotor blades and the stationary structure in which the rotor revolves during operation of the machine have been proposed. These, their disadvantages, and patents in which they are disclosed are described in detail in parent application Ser. No. 335,320.

In our parent application we disclosed novel, lightweight, porous, durable, stable, compliant structures which, employed as seals, are free of the disadvantages of those referred to in the preceding paragraph. These novel structures or materials consist of an assemblage of metallic foils or strips disposed in side-by-side relationship with the edges of the foils at opposite sides of the assemblage.

Part or all of the strips are corrugated or otherwise embossed. The corrugations are formed and the adjacent strips so positioned as to prevent nesting and to create interstices between the strips ("Nesting" is the condition in which one strip contacts an adjacent strip or strips over a substantial area and thereby eliminates interstices between the strips to a significant extent).

These novel structures have a number of important advantages. They are self-supporting and possess a high degree of compliance in applications where they are rubbed by rotor blade tips, for example. Because of their high compliance, these novel structures also accommodate a considerable amount of misalignment between the components spanned by them. At the same time, they do not exhibit significant anti-clastic effects; that is, they can be bent or curved in one direction without incurring damaging distortion in directions normal to the bend.

A related advantage is that the compliance of our previously disclosed structures remains high even in applications where changing temperatures or temperature differentials cause thermal expansion and/or contraction of the metallic assemblage which induces changes in the distances between the components sealed by the structure.

Another advantage of our previously disclosed invention is that a wide range of abradability and/or compliance or elasticity and a porosity which ranges from almost zero up to a level sufficiently high to allow pumping to occur, or higher, can be provided by varying the configuration and/or the inclination of the corrugations, the positioning, width, and thickness of the foils, and by perforating for example.

Still another advantage of the structures disclosed in application Ser. No. 335,320 flows from the availability of a wide variety of metallic foils, making it possible to fabricate structures having widely different physical characteristics.

Yet another advantage of our earlier invention is a result of the edgewise relationship of the foils to the support or backing member. Because of this relationship and the configurations of the interstices, the area to be joined between the strips and the backing member is minimized with a concurrent reduction in fabrication problems. At the same time the risk of distorting the component in the process of bonding the support or backing member to the foil is significantly reduced.

A further important advantage of the novel structures disclosed in patent application Ser. No. 335,320 is that they can be made from materials which are difficult to form and to fabricate. Similarly, perforated notched, and other opened foils which can otherwise be handled only with difficulty and at high cost can be readily fabricated into structures embodying the principles of our earlier invention.

At the same time these novel structures can, in contrast to those of the honeycomb and comparable types, readily be fabricated in a variety of shapes such as flat, joggled or stepped, cylindrical (straight, tapered, etc.), oblate, conical, hourglass, convergent-divergent, and others.

Another important advantage of the same general character is that our heretofore disclosed structures can be readily shaped and/or formed to precise dimensions after fabrication by any one or a combination of a variety of techniques such as bending, rolling, sizing, coining, deep drawing, bulging, swaging, stretch forming, shear spinning, grinding, lapping, and the like.

A related advantage is that these structures can be formed by the foregoing and other techniques into configurations having very small radii or of very small diameters without deleterious anti-clastic effects. This attribute makes them useful as shaft seals and/or similar devices.

Yet another and of course highly important advantage of the invention in question is that structures having the various advantages described above are comparatively inexpensive.

Still other important advantages of the structures described above are discussed in parent application Ser. No. 335,320.

We have now invented novel composite structures which have all the desirable attributes of those disclosed in our earlier application and other advantages as well. The novel structures disclosed herein are of the same general character as the earlier ones in that they are composed of an assemblage of corrugated metal strips. Backing or support members can be attached to one, or both, sides of the assemblage.

The composite structures of the present invention can, in one aspect, differ from those described in our earlier application in that the edges of the metal strips or foils are folded over on one side of the assemblage of strips. This increases the continuity of the working surface, depending upon the extent to which the strips are folded. The working surface is also smoother, and tolerances can be more closely controlled when edge folding is employed.

Another innovation the novel structures disclosed herein may feature is the bonding together of the strips at random locations where the corrugations of adjacent strips touch. The bond is restricted to a minute area in these locations.

The bonding together of the corrugated strips in the manner just described adds sufficient structural integrity to the structure to facilitate handling and processing. At the same time the compliance of the structure is retained as it would not be if extensive nodal bonding as disclosed in U.S. Pat. No. 3,037,592 issued June 5, 1962, to Shipley were employed, for example.

This node-to-node bonding can also be taken advantage of to increase the stiffness of the foil assemblage and thereby improve its resistance to fatigue and to stiffen the matrix so that it will better anchor fillers in the interstices between the strips.

A third unique feature that the novel structures disclosed herein may have is a combination of flat or uncorrugated strips at the edges of the core in combination with corrugated strips elsewhere in the assemblage of metal strips. This novel construction increases edge strength and resistance to lateral forces while retaining high compliance.

One, or two or more, such strips can be employed; and if, multiple strips are employed, they are alternated with corrugated strips. The flat or planar strips are typically bonded to the strips between which they are sandwiched along the full lines of contact therebetween.

Increased lateral and edge strength can alternatively be obtained in accord with the present invention by deliberately nesting two or more strips at the edges of the assemblages and bonding the nested strips together. The bonding forming material integrates the nested strips, producing a strong edge resistant to deformation by laterally acting forces.

Combinations of the novel features just described can of course be employed. For example, point bonding at the locations where corrugations of adjacent strips are in contact can be used in association with the constructions employing planar or nested edge strips to provide even greater strength. Edge folding can of course be used in conjunction with any of the other novel features described above to provide the advantage it affords.

Like those disclosed in parent application Ser. No. 335,320, the novel metallic structures of the present invention are useful for many purposes other than those discussed above. Examples of applications for which they are suited include insulation, sound attenuation, and reinforcement for other materials. They may also be fabricated as piston rings, slide valve seals, cryogenic bearings, seals, and valve members; our structures may also be used for still other purposes including screens, catalyst supports, diffusers and transpiration type heat exchange elements.

From the foregoing it will be apparent to the reader that one important and primary object of our invention resides in the provision of novel, improved metallic structures which have the desirable attributes disclosed in parent application Ser. No. 335,320 and other advantages.

Another primary object of the present invention is the provision of novel, improved metallic structures with smoother and more continuous working surfaces and closer tolerances than those disclosed in parent application Ser. No. 335,320.

Yet another primary object of the invention resides in the provision of metallic structures of the character disclosed herein which have greater structural integrity than those disclosed in parent application Ser. No. 335,320 and are accordingly more easily handled and processed.

An additional important and primary object of the invention resides in the provision of metallic structures of the character described herein which combine a high degree of compliance with high resistance to lateral deflection.

A related and also important object of the invention resides in the provision of metallic structures as described in the preceding object in which bonded together, uncorrugated or nested strips are employed at the edges of the metal foil assemblage to increase the edge strength of and resistance to lateral deformation possessed by the structure.

Other objects and features and additional advantages of the invention will become apparent from the appended claims and from the ensuing detailed description and discussion, taken in conjunction with the accompanying drawing, in which:

Figure 1:
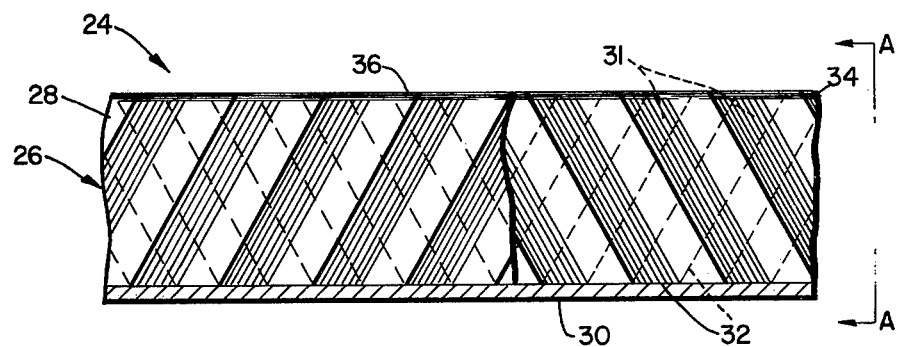
FIG. 1 is a somewhat pictorial section through a structure constructed in accord with and embodying the principles of the present invention.

Referring now to the drawing, FIG. 1 depicts a composite structure 24 which includes an assemblage or matrix 26 of metal strips 28 disposed in side-by-side relationship with the edges of the strips at opposite sides of the matrix. A rigid backing or support member 30 is fixed to the strips in matrix 26 as by brazing or by any of the other bonding techniques discussed in parent application Ser. No. 335,320.

There are interstices 31 between adjacent strips. These are provided by corrugating strips 28 and then so assembling them that the corrugations in adjacent strips will come into contact at intervals therealong to space the strips apart and form the interstices therebetween.

Any desired shape of corrugation may be employed as well as strips having combinations of different corrugation configurations as long as the strips are kept from nesting.

In composite structure 24 the corrugations 32 in strips 28 extend at an angle across the strips and from edge-to-edge thereof. The strips are assembled so that the corrugations 32 in adjacent strips are inclined in opposite directions. Thus the corrugations in the adjacent strips intersect in X-like patterns, spacing apart the adjacent strips to form interstices therebetween.

For the reasons explained in parent application Ser. No. 335,320 the bonding material by which backing or support member 30 is attached, is confined to those edge portions of the strips nearest the support member, leaving the strips otherwise free to move relative to each other. This provides a high degree of compliance in that the opposite edges of the strips are free to independently and elastically yield or deform into a virtual zero tolerance fit with moving components associated with them.

The matrix of composite structbre 24 may be made in any desired manner. For example, the foils 28 can be wound in side-by-side relationship on a rotating mandrel. The facing or support member 30 is then bonded to the exposed side of the matrix and the mandrel removed to complete the manufacturing process.

The dimensions of the strips will vary, depending upon the use to which the structural member is to be put as will the diameters of the interstices 31, the thickness of the facing 30, the materials from which the facing and strips are formed, etc. Typically, however, the distance between the two edges of the matrix will range from 0.05 to 1.00 inch; and the interstices will range from 0.005 to 0.250 inch in effective diameter.

The strips will typically be formed of 0.0005 to 0.010 inch thick material.

Both the strips 28 and the support member 30 can be made from a variety of metals, depending upon the use to which the member is to be put. For high temperature applications, these include Hastelloy X and oxidation resistant alloys of the iron-chromium-aluminum and cobalt-chromium-aluminum-yttrium types.

If maximum elasticity is important, heat treatable alloys such as the aluminum-based 7075, 7178, and 2024 alloys; beryllium copper and beryllium nickel alloys; nickel and iron-based alloys such Inconel-X750, 718, and A-286; and titanium-aluminum-vanadium alloys can be utilized.

Other exemplay metals from which the strips can be made include silver and tungsten and their alloys.

The strips can also be molded from refractories such as alumina and thoria which can be filled with fibers or other reinforcements if desired.

Still other variations which may be employed are to make the strips of bimetallic or composite metallic-metallic or metallic-non-metallic materials. They may also be coated to change their characteristics.

Again, depending upon the particular characteristics wanted in the structural member, the interstices between strips 28 may be filled with a variety of abradable materials (for example, Teflon (a tetrafluoroethylene fluorocarbon resin), polyimides, graphites, boron nitrides, ceramics, metals, and various combinations of the foregoing).

The backing or support member employed in the structures we have invented can also vary considerably in character. Although it can obviously be of any thickness, the support member will typically, though not necessarily, be from 0.002 to 0.10 inch thick. It can be smooth and imperforate; or it can be of embossed, perforated, expanded, or other material depending upon the application of the invention.

The support member can, in some applications, be omitted altogether. In this case the strips are bonded together at one side of the matrix to keep them in the proper relationship.

Also, the member can be treated after it is assembled to alter its characteristics if the intended application so dictates. For example, it may be desirable to minimize the tendency of the member to gall and/or to reduce its coefficient of friction.

Examples of post-fabrication treatments include nitriding, coating, etc.

Figure 2:
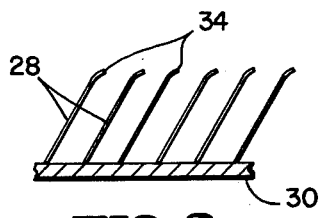
FIGS. 2–4 are pictorial side views of the structure, looking in the direction perpendicular to the plane of the arrows A—A in FIG. 1; they show different degrees to which the working surface of a structure can be made continuous by folding over the edge portions of the metal strips making up the structure in accord with the principles of the present invention.
Figure 3:
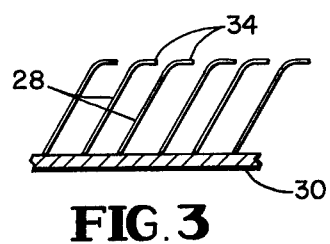
Figure 4:
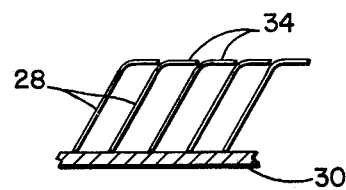

The novel composite structure 24 shown in FIG. 1 differs from those disclosed in patent application Ser. No. 335,320 in that the edges of the strips 28 making up matrix 26 are folded laterially — to a slight extent as shown in FIG. 2, completely so that the folded over portion 34 of one strip 28 touches the adjacent strip as shown in FIG. 4, or to an intermediate extent such as shown in FIG. 3. As indicated above and shown in FIGS. 2–4, this lateral folding of the edge portions of the strips increases the continuity of the working surface 36 of the composite structure to an extent dependent upon the degree of folding.

FIGS. 2–4 represent the appearance, after folding to various extents, of a structure as shown in FIG. 1 in which the strips were fabricated of 0.002 inch thick Inconel 600 and had 16 corrugations per inch of length. The strips were brazed to an 0.065 inch thick Inconel 600 backing member.

The strips in FIG. 2 specimen were folded to an extent which reduced the thickness between the front and back sides of structure 24 by ca. 0.002 inch. The folds are almost undectable to the naked eye, but still increase the continuity of the working surface by an appreciable amount as shown in FIG. 2. Even slight folds as shown in this Figure are also sufficient to make the working surface smoother and to permit dimension tolerances on the order of a few thousandths of an inch to be obtained.

FIG. 3 is an idealized illustration of a specimen in which the crush or folding reduced the thickness of the composite by 0.010 inch. The increase in solid working wurface is extensive, and a considerable increase over dimensional control and in smoothness are afforded.

FIG. 4 represents the appearance of a specimen in which the full fold resulted in the thickness of the structure being reduced by 0.035 inch. The working surface of this specimen presented an essentially solid appearance to the naked eye. Smoothness of the working surface and dimensional control are maximized in this specimen.

Figure 8:
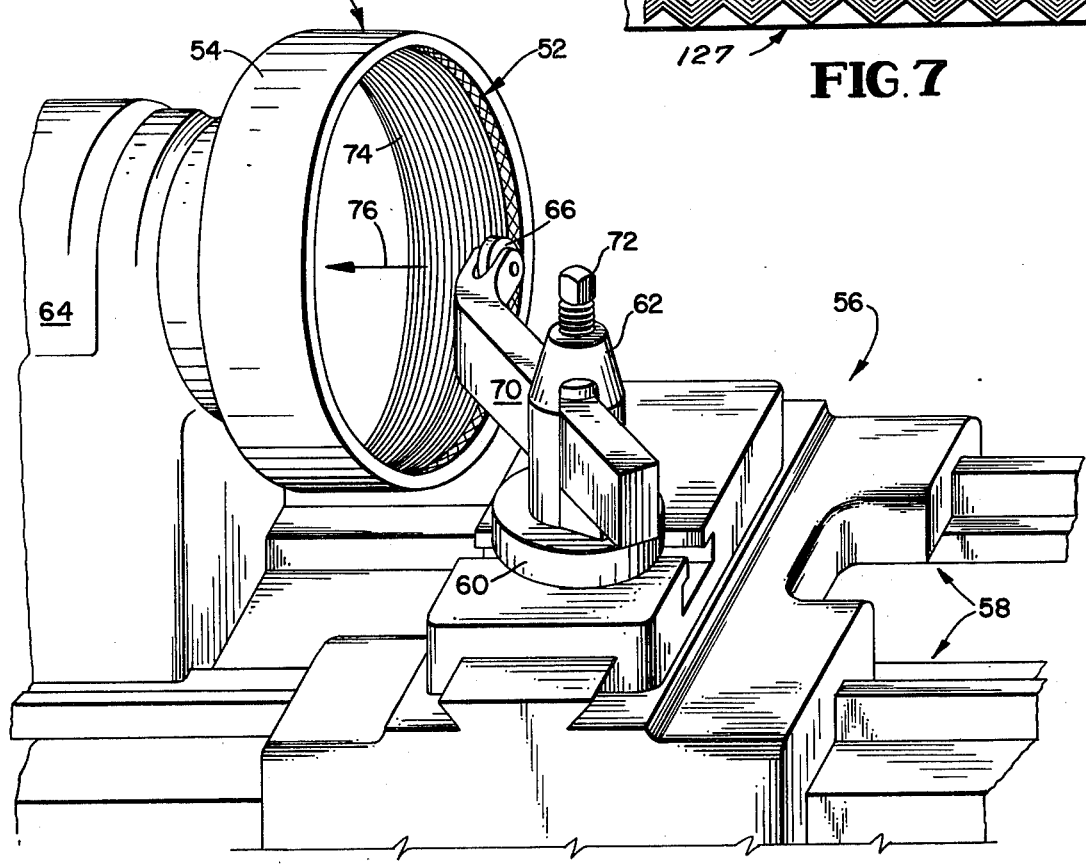
FIG. 8 is a pictorial view of apparatus which can be employed to accomplish edge folding as shown in FIGS. 2–4.

Referring again to the drawing, FIG. 8 shows one set-up that can be employed to fold over the edges of the metallic strips incorporated in a composite structure of the character just described. The illustrated arrangement is capable of deforming or folding the strips to the required extent (slight to full) with a degree of accuracy sufficient to maintain the tolerances of the component within a few thousandths of an inch or less.

The composite structure 50 depicted in the process of being treated in FIG. 8 is a rub ring. Rub rings are employed to keep compressor and exhaust gases from flowing between the tips of turbine blades and a surrounding casing as this flow can significantly decrease the efficiency of a turbine. A similar appearing composite structure is also employed to minimize or control leakage in compressor and turbine labyrinth seals.

Rub ring 50 has a matrix 52 of the construction described above in conjunction with FIG. 1. The matrix is surrounded by annular backing or support member 54 to which the corrugated strips making up the matrix are bonded.

In the folding or crushing operation rub ring 50 is chucked on to and rotated by the spindle (not shown) of a conventional engine lathe 56 which include the customary bed 58, compound rest 60, tool post 62, and headstock 64.

The folding is accomplished by a hardened steel or cemented carbide roller 66 mounted in tool 70. This tool is secured in tool post 62 by screw 72.

As rub ring 50 rotates, roller 66 deforms or folds over those edges of the strips defining the working surface 74 of the rub ring to an extent determined by the positioning of the roller. As the operation proceds, roller 66 is traversed across the working surface of the rub ring as indicated by arrow 76 in FIG. 8, continuing the folding operation across the span of this surface.

This preferred method of folding the edges of the strip is by no means the only one which may be employed. Alternates include galling, abrasive grinding, platen pressure, impacting, pinching between rolls, burnishing, etc.

Figure 5:
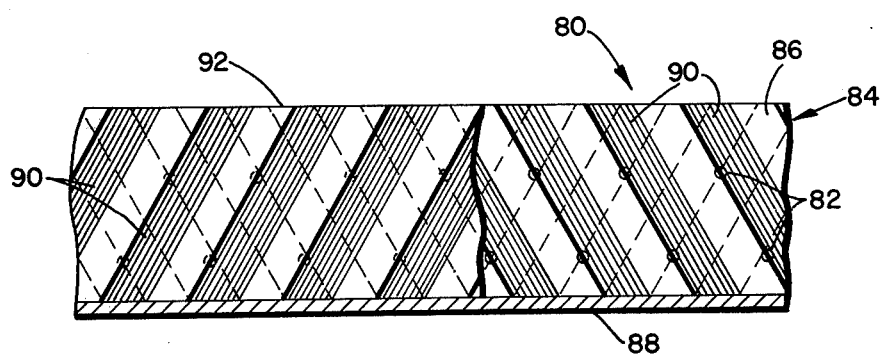
FIG. 5 is a view similar to FIG. 1 showing the metal strips of a structure as described above bonded at random points of contact therebetween in accord with the principles of the present invention to enhance the structural integrity of the structure.

Referring again to the drawing, FIG. 5 depicts a composite structure 80 in which, in accord with the principles of the present invention, minute, randomly distributed bonds 82 are employed to increase the structural integrity of the structure to, for example, facilitate manufacturing operations such as the crushing or edge folding step just described.

Aside from bonds 82, composite structure 80 is of the construction shown and described in conjunction with FIG. 1. It includes a matrix 84 composed of corrugated strips 86 and a backing or support member 88. In this structure the edges of the strips have not been folded over to emphasize that node-to-node bonding and edge folding are innovations that can be independently employed.

The particular manner in which the node-to-node bonds are formed is not critical, and various techniques will be readily apparent to those skilled in the relevant arts. In one exemplary technique, lines of a brazing adhesive such as Wall Colmonoy's acrylic Nicrobraz are laid on the nodes or corrugations 90 of one of two strips which are to be bonded together. The strips are then brought into contact and allowed to stand for, typically, 0.5–1 hour. Over this period, additional adhesive migrates to the areas of contact between the nodes of the foils by capillary action.

A conventional brazing powder is then sifted into the assemblage and the latter inverted and tapped to remove excess powder from the interstices between the strips.

Finally, the assemblage is heated, melting the brazing powder to form the wanted node-to-node bonds. In th course of heating the structure, the adhesive carburizes which assists in retaining the brazed metal in place until the bond is formed.

In a second, exemplary technique, the node-to-node bonds are formed only to a selected depth from the working surface 92 of the composite structure. A strip of an adhesive brazing tape such as Wall Colmonoy Nicrobraz, which is an admixture of adhesive and brazing powder, is laid on the working surface of the structure and pressed into the matrix as with a roller, for example. This produces a "cookie cutter" action, leaving portions of the tape embedded in the interstices between the strips 86 adjacent working surface 92. The structure is then heated, melting the braze metal and forming node-to-node bonds between the strips in the regions adjacent the working surface.

The depth to which the bonds extend can be varied by, for example, using brazing tapes of different thicknesses or by employing two or more tapes.

As indicated above, another of our innovations is the use of planar or uncorrugated strips at the opposite edges of a composite structure matrix to increase edge strength and resistance to lateral deformation. A composite structure of this character is illustrated in FIG. 6 and identified by reference character 100.

The matrix 102 of structure 100 is made up primarily of corrugated strips 104 of the character described above. At each edge 106 of the structure, however, planar or uncorrugated metal strips 108 and 110 are sandwiched between successive corrugated strips 104.

Figure 6:
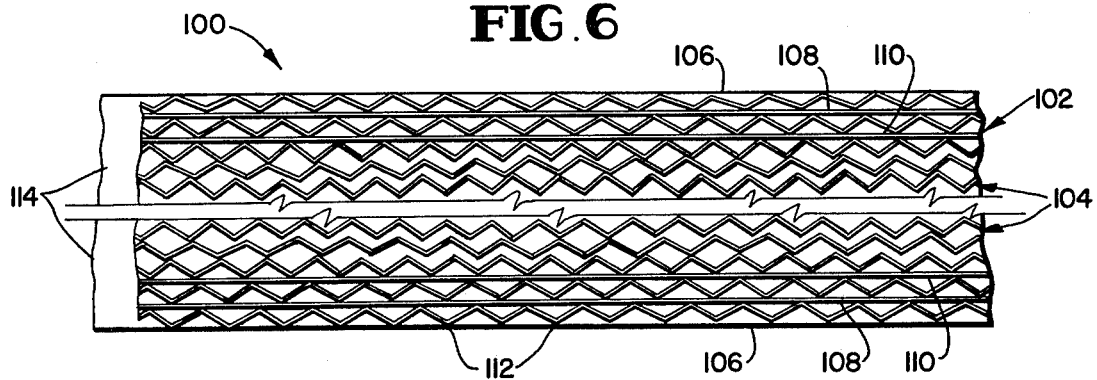
FIG. 6 is a plan view of a structure as described above which has planar strips at the opposite edges of the assemblage of strips to make the structure more resistant to lateral forces.

As suggested by FIG. 6, the corrugations 112 of the strips 104 between which strips 108 and 110 are sandwiched are in contact with the planar strips across the width or span of the latter. The corrugated and planar strips are bonded together along these full lines of contact by brazing or welding.

This can, for example, be accomplished as the support or backing member 114 is attached as the metal employed to bond the backing member to the matrix can flow through the interstices between the corrugated and flat strips to the working surface of the structure, furnishing bonding material along the full line of contact between the corrugated and uncorrugated strips.

The resultant structure has a substantially increased resistance to lateral forces and, more particularly, significantly increased edge strength. At the same time, the compliance of the working surface remains high as it is defined primarily by corrugated strips which are connected together only at the edge portions thereof nearer backing strip 114 or, additionally, by random, pointlike bonds formed as described above in conjunction with the embodiment of FIG. 5.

Structures as shown in FIG. 6 will typically be fabricated of the materials identified above and will have dimensions comparable to those of the previously described structures.

For example, one typical structure of the type shown in FIG. 6 had a matrix composed of Hastelloy X strips. The material was 0.005 inch thick and 0.100 inch wide. The strips had twelve corrugations per lineal inch.

It was pointed out above that node-to-node bonding as shown in FIG. 5 may be employed in the structures illustrated in FIG. 6. Also, the edges of the strips making up such structures may be folded over as shown in FIGS. 2-4 to obtain the advantages which result from doing so.

It is not necessary that exactly two planar or uncorrugated strips be employed. A single strip may be used, or more than two may be utilized. Also, it is not necessary that the uncorrugated strips be of the same thickness or widths as the corrugated ones or, indeed, even of the same material. It is essential for the retention of compliance, however, that the uncorrugated strips be confined to the edge portions of the matrix.

Figure 7:
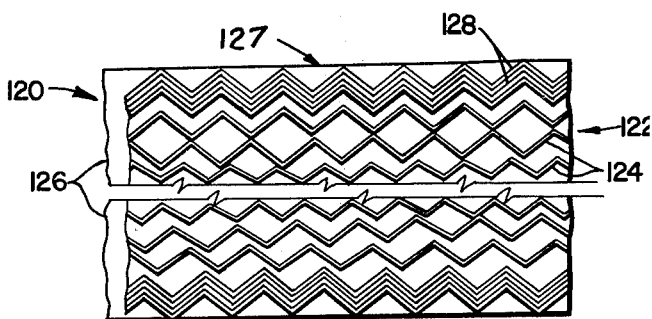
FIG. 7 is a view similar to FIG. 6 of a composite structure with the strips at opposite edges thereof nested and bonded together in accord with the principles of the present invention to make the structure more resistant to laterally acting forces.

Increased strength and resistance to lateral forces can also be provided by nesting two or more corrugated strips together at the edges of the matrix and joining the nested strips as by welding or brazing. An exemplary composite structure of this character is illustrated in FIG. 7 and identified by reference character 120.

This composite structure is of generally the same character as those described above, being made up of an assemblage or matrix 122 of corrugated foils 124 and a backing member or facing 126. For the most part, the strips in matrix 122 are made up of foils configured and assembled to space the strips apart and provide interstices therebetween.

At the edges 127 of the structure, however, nested strips 128 are employed. Four such strips are shown, but this number may be varied as desired.

The strips 128 are integrated as by welding or brazing, for example, forming a strong edge. At the same time the working surface of the structure remains predominantly of compliant character.

As was the case with the structure shown in FIG. 6, that illustrated in FIG. 7 may also have node-to-node bonds, if desired; and the edges of strips 124 may be folded to obtain the advantages this affords.

Structures of the character shown herein and embodying any or all of the innovations described above can be produced in an endless variety of shapes. For example, annular configurations with the working surface on either the inside or the outside of the component are readily fabricated as are components with flat working surfaces. Conical shapes and structures which are annular segments have been made as have components with stepped working surfaces.

It will also be apparent from the foregoing that there are countless forms of metallic foils or strips and combinations thereof which can be employed in the practice of the present invention. It is to be understood, therefore, that the embodiments of the invention hereinbefore described are intended to be merely illustrative only and not inclusive, inasmuch as many alternate arrangements which will prevent nesting and provide interstices between the strips can be employed.

From the foregoing illustrations of vaious embodiments of the present invention, it will be apparent that the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A member of composite construction comprising an assemblage of metal strips disposed in side-by-side relationship with the edges of the strips at opposite sides of the assemblage and those edges of the strips at one side of the assemblage being exposed and defining a working surface; means formed in said strips for providing interstices therebetween; and means for maintaining the strips in the assemblage in the aforesaid relationship, those portions of the metal strips including the edges thereof on one side of said assemblage being folded and extended toward an adjacent strip of the assemblage to thereby increase the continuity and smoothness of the working surface presented by said one side of said assemblage, said folded portions of said strip being free of attachment to the strips toward which they extend whereby the working surface of the composite member will have a high degree of compliance with components with which said member is associated.

2. The member of claim 1 wherein said strips are diagonally corrugated, corrugations in adjacent strips being in contact and spacing the strips apart to provide the interstices therebetween.

3. The member of claim 1 wherein the means maintaining the strips of the assemblage in the wanted relationship comprises a rigid backing member and means fixing said backing member to the edges of the strips at one side of said assemblage.

4. A member of composite construction comprising an assemblage of metal strips disposed in abutted, side-by-side relationship with the edges of the strips at opposite sides of the assemblage, said strips being corrugated and the corrugations of adjacent strips having essentially only point-to-point contact; means for spacing said strips apart to provide interstices therebetween, said means being contacting corrugations formed in adjacent strips; and means for maintaining the strips in the assemblage in the aforesaid relationship, said last-mentioned means including bonds between adjacent strips, said bonds being limited to those locations at which there is essentially point-to-point contact between the corrugations of adjacent strips.

5. The member of claim 4 wherein those portions of the metal strips including the edges thereof on one side of said assemblage are folded and extend toward an adjacent strip of the assemblage to thereby increase the continuity and smoothness of the working surface presented by said one side of said assemblage, said folded portions of said strips being free of attachment to the strips toward which they extend whereby the working surface of the composite member will have a high degree of compliance with components with which said member is associated.

6. The member of claim 4 wherein there are planar strips at the edges of the assemblage only for increasing the resistance of the member to lateral forces, said strips otherwise being so corrugated that the corrugations of adjacent strips space said stips apart to provide interstices therebetween as aforesaid.

7. A member of composite construction comprising an assemblage of metal strips disposed in side-by-side relationship with the edges of the strips at opposite sides of the assemblage, said strips being corrugated and the corrugations of adjacent strips spacing said strips apart and providing interstices therebetween; means for maintaining the strips in the assemblage in the aforesaid relationship; and planar strips at the edges of the assemblage only for increasing the resistance of the member of lateral forces, said planar strips each being disposed between and in engagement with two adjacent, corrugated strips and said planar strips being bonded to the corrugated strips between which they are disposed over essentially the entire areas of contact between the planar strips and the corrugated strips.

8. The member of claim 7 wherein those portions of the metal strips including the edges thereof on one side of said assemblage are folded and extend toward an adjacent strip of the assemblage to thereby increase the continuity and smoothness of the working surface presented by said one side of said assemblage, said folded portions of said strips being free of attachment to the strips toward which they extend whereby the working surface of the composite member will have a high degree of compliance with components with which said member is associated.

9. A member of composite construction comprising an assemblage of metal strips disposed in abutted, side-by-side relationship with the edges of the strips at opposite sides of the assemblage, said strips being corrugated and the corrugations of adjacent strips spacing said strips apart and providing interstices therebetween; means for maintaining the strips in the assemblage in the aforesaid relationship; and means at each edge of said assemblage only for increasing the edge strength and resistance to lateral forces of the member comprising at least two corrugated strips which are nested together and have a substantial area of contact therebetween and means bonding the nested strips together over at least a substantial part of the contact area.

10. The member of claim 9 wherein the corrugations of adjacent strips except for those nested together at the edges of the assemblage have essentially only point-to-point contact and wherein the means for maintaining the strips of the assemblage in the wanted relationship comprises bonds between adjacent strips, said bonds being limited to those locations in which there is essentially point-to-point contact between the corrugations of adjacent strips.

11. The member claim 9 wherein those portions of the metal strips including the edges thereof on one side of said assemblage are folded and extend toward an adjacent strip of the assemblage to thereby increase the continuity and smoothness of the working surface presented by one side of said assemblage, said folded portions of said strips being free of attachment to the strips toward which they extend whereby the working surface of the composite member will have a high degree of compliance with components with which said member is associated.

12. A member of composite construction comprising an assemblage of metal strips disposed in abutted, side-by-side relationship with the edges of the strips at opposite sides of the assemblage and those edges of the strips at one side of the assemblage exposed and defining a working surface, said strips being corrugated and the corrugations of adjacent strips spacing the strips apart and providing interstices therebetween, the corrugations of adjacent strips having essentially only point-to-point contact, those portions of said metal strips including the edges on said one side of the assembly being folded and extending toward an adjacent strip of the assemblage to thereby increase the continuity and smoothness of the working surface presented by said one side of said assemblage, and said folded portions of said strips being free of attachment to the strips toward which they extend whereby the working surface of the composite member will have a high degree of compliance with components with which said member is associated; means for maintaining said strips in the aforesaid relationship comprising bonds between adjacent strips limited to those locations at which there is essentially point-to-point contact between the corrugations of adjacent strips; and planar strips at the edges of the assemblage only for increasing the resistance of the member to lateral forces, said planar strips each being disposed between and in engagement with two adjacent corrugated strips and said planar strips being bonded to the corrugated strips between which they are disposed essentially the entire contact areas between the planar strips and the corrugated 13. A member of composite construction comprising an assemblage of metal strips disposed in abutted, side-by-side relationship with the edges of the strips at opposite sides of the assemblage and those edges of the strips at one side of the assemblage exposed and defining a working surface, said strips being corrugated and the corrugations of adjacent strips spacing the strips apart and providing interstices therebetween, the corrugations of adjacent strips having essentially only point-to-point contact, those portions of the metal strips including the edges thereof on said one side of said assemblage each being folded and extending toward an adjacent strip of the assemblage to thereby increase the continuity and smoothness of the working surface presented by said one side of said assemblage, and said folded edge portions of said strips being free of attachment to the strips toward which they extend whereby the working surface of the composite member will have a high degree of compliance with components with which said member is associated; means for maintaining said strips in the aforesaid relationship comprising bonds between adjacent strips which are limited to those locations at which there is essentially point-to-point contact between the corrugations of adjacent strips; and means at each edge of said assemblage only for increasing the edge strength and resistance to lateral forces of the member comprising, at said each edge of the assembly, at least two corrugated strips which are nested together and have a substantial area of contact therebetween and means bonding the nested strips together over at least a substantial part of the contact area.

* * * * *

UNITED STATES PATENT AND TRADEMARK OFFICE
CERTIFICATE OF CORRECTION

PATENT NO. : 4,031,279
DATED : June 21, 1977
INVENTOR(S) : Cremer et al

It is certified that error appears in the above-identified patent and that said Letters Patent are hereby corrected as shown below:

Column 3, line 50, change "bonding" to --bond--.

Column 5, line 34, change "structbre" to --structure--.

Column 5, line 62, change "exemplay" to --exemplary--.

Column 6, line 60, change "wurface" to --surface--.

Column 7, line 25, change "include" to --includes--.

Column 7, line 34, change "proceds" to --proceeds--.

Column 8, line 6, change "th" to --the--.

Column 9, line 58, change "vaious" to --various--.

Column 10, line 60 (Claim 6), change "stips" to --strips--.

Column 11, line 44 (Claim 11, add --of-- between "member" and "claim".

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*